United States Patent
Van Hassel

(10) Patent No.: US 9,295,960 B2
(45) Date of Patent: Mar. 29, 2016

(54) CATALYTIC REACTION IN CONFINED FLOW CHANNEL

(75) Inventor: Bart A. Van Hassel, Weatogue, CT (US)

(73) Assignee: United Technologies Corporation, Hartford, CT (US)

(*) Notice: Subject to any disclaimer, the term of this patent is extended or adjusted under 35 U.S.C. 154(b) by 986 days.

(21) Appl. No.: 13/428,741

(22) Filed: Mar. 23, 2012

(65) Prior Publication Data

US 2013/0247582 A1 Sep. 26, 2013

(51) Int. Cl.
| | |
|---|---|
| *F02C 3/28* | (2006.01) |
| *C01B 3/26* | (2006.01) |
| *C01B 3/06* | (2006.01) |
| *B01J 8/08* | (2006.01) |
| *B01J 8/20* | (2006.01) |
| *B01J 8/10* | (2006.01) |
| *B01J 19/20* | (2006.01) |
| *C10G 11/14* | (2006.01) |
| *F02M 21/02* | (2006.01) |
| *F02M 27/02* | (2006.01) |
| *H01M 8/06* | (2006.01) |
| *H01M 8/04* | (2006.01) |
| *B82Y 30/00* | (2011.01) |

(52) U.S. Cl.
CPC .... *B01J 8/08* (2013.01); *B01J 8/10* (2013.01); *B01J 8/20* (2013.01); *B01J 19/20* (2013.01); *C01B 3/065* (2013.01); *C01B 3/26* (2013.01); *C10G 11/14* (2013.01); *F02C 3/28* (2013.01); *F02M 21/0206* (2013.01); *F02M 27/02* (2013.01); *H01M 8/04216* (2013.01); *H01M 8/065* (2013.01); *H01M 8/0606* (2013.01); *B01J 2208/026* (2013.01); *B82Y 30/00* (2013.01); *C01B 2203/066* (2013.01); *Y02E 60/362* (2013.01); *Y02E 60/50* (2013.01); *Y02T 10/32* (2013.01)

(58) Field of Classification Search
None
See application file for complete search history.

(56) References Cited

U.S. PATENT DOCUMENTS

| | | |
|---|---|---|
| 4,009,751 A | 3/1977 | Zelnik |
| 4,481,154 A | 11/1984 | Gough et al. |
| 5,194,231 A | 3/1993 | Gough et al. |
| 5,591,034 A | 1/1997 | Ameen et al. |

(Continued)

FOREIGN PATENT DOCUMENTS

| | | |
|---|---|---|
| DE | 10032302 A1 | 10/2001 |
| EP | 1277698 A2 | 1/2003 |

(Continued)

OTHER PUBLICATIONS

Machine translation for JP 2006-213563 A (Aug. 2006).*

(Continued)

*Primary Examiner* — Jennifer A Leung
(74) *Attorney, Agent, or Firm* — Kinney & Lange, P.A.

(57) ABSTRACT

A chemical reactor comprises a flow channel, a source, and a destination. The flow channel is configured to house at least one catalytic reaction converting at least a portion of a first nanofluid entering the channel into a second nanofluid exiting the channel. The flow channel includes at least one turbulating flow channel element disposed axially along at least a portion of the flow channel. A plurality of catalytic nanoparticles is dispersed in the first nanofluid and configured to catalytically react the at least one first chemical reactant into the at least one second chemical reaction product in the flow channel.

24 Claims, 3 Drawing Sheets

(56) References Cited

U.S. PATENT DOCUMENTS

| | | | |
|---|---|---|---|
| 5,935,889 A * | 8/1999 | Murrell et al. | 502/9 |
| 6,589,312 B1 | 7/2003 | Snow et al. | |
| 6,849,247 B1 | 2/2005 | Wagaman et al. | |
| 6,855,272 B2 | 2/2005 | Burlingame et al. | |
| 6,962,193 B2 | 11/2005 | Liu et al. | |
| 7,306,780 B1 | 12/2007 | Kravitz et al. | |
| 7,744,830 B2 | 6/2010 | Morse et al. | |
| 7,846,417 B2 | 12/2010 | Singh et al. | |
| 8,003,073 B2 | 8/2011 | Pez et al. | |
| 8,057,988 B2 | 11/2011 | Morse et al. | |
| 2003/0064011 A1 * | 4/2003 | Burlingame et al. | 422/198 |
| 2004/0091402 A1 | 5/2004 | Lewin et al. | |
| 2004/0228781 A1 | 11/2004 | Tonkovich et al. | |
| 2006/0257313 A1 * | 11/2006 | Cisar et al. | 423/648.1 |
| 2007/0122322 A1 | 5/2007 | Te Raa et al. | |
| 2007/0274882 A1 | 11/2007 | Mosler et al. | |
| 2009/0143765 A1 | 6/2009 | Slocum et al. | |
| 2009/0145761 A1 | 6/2009 | Van Hassel | |
| 2010/0178240 A1 * | 7/2010 | Capron et al. | 423/657 |
| 2010/0252444 A1 | 10/2010 | Vajo et al. | |
| 2011/0070152 A1 | 3/2011 | Abdur-Rashid et al. | |

FOREIGN PATENT DOCUMENTS

| | | | |
|---|---|---|---|
| JP | 2006213563 A * | 8/2006 | |
| WO | WO2012057206 A1 | 5/2012 | |

OTHER PUBLICATIONS

"Monodisperse Nickel Nanoparticles and Their Catalysis in Hydrolytic Dehydrogenation of Ammonia Borane", Metin et al., Journal of American Chemical Society, 2010.

"Ni(1−x)PT(x)(x=0 0.12) Hollow Spheres as Catalysts for Hydrogen Generation from Ammonia Bronane", Cheng et al., Inorganic Chemistry 2007.

"Preparation and catalysis of poly (N-vinyl-2-pyrrolidone) (PVP) stabilized nickel catalyst for hydrolytic dehydrogenation of ammonia borane", Umegaki et al., Int'l J. Hydrogen Energy 2009.

"Advancement of Systems Designs and Key Engineering Technologies for Materials Based Hydrogen Storage", Van Hassel et al, DOE Hydrogen Program, Annual Merit Review, Washington, D.C., May 11, 2011; http://www.hydrogen.energy.gov/pdfs/review11/st006_van_hassel_2011_o.pdf.

Hydrogen Storage by Novel CBN Heterocycle Materials, Shih-Yuan Liu, DOE Hydrogen Program, Annual Merit Review, Washington, D.C., May 13, 2011; http://www.hydrogen.energy.gov/pdfs/review11/st038_liu_2011_o.pdf.

The International Search Report mailed May 10, 2013 for the International Application No. PCT/US13/26237.

Extended European Search Report, European Application No. 13764733.5, dated Feb. 10, 2016, 10 pages.

* cited by examiner

CATALYTIC REACTION IN CONFINED FLOW CHANNEL

STATEMENT OF GOVERNMENT INTEREST

This invention was made with government support under Contract No. DE-FC36-09GO19006 awarded the Department of Energy. The government has certain rights in the invention.

BACKGROUND

This specification relates generally to fluids in flow channels, and more specifically to catalytic reactions of fluids in flow channels.

Chemical reactions can take place in any number of reactors suited to control the rate and parameters. Reactions can take place in vessels, fluidized beds, etc. In some instances, there is little available operational space to include a separate reactor vessel. Further, due to time, space, and/or safety considerations, it may be undesirable to store certain reaction products for any length of time. This is the case, for example, in motorized vehicles.

SUMMARY

A chemical reactor comprises a flow channel, a source, and a destination. The flow channel is configured to house at least one catalytic reaction converting at least a portion of a first nanofluid entering the channel into a second nanofluid exiting the channel. The flow channel includes at least one turbulating flow channel element disposed axially along at least a portion of the flow channel. The source is in fluid communication with an entrance of the flow channel and configured to contain at least one first chemical reactant serving as a first base fluid for the first nanofluid. The destination is in fluid communication with an exit of the flow channel receiving at least one second chemical reaction product serving as a base fluid for the second nanofluid. A plurality of catalytic nanoparticles is dispersed in the first nanofluid and configured to catalytically react the at least one first chemical reactant into the at least one second chemical reaction product in the flow channel.

Optionally, the turbulating flow channel element is compressible and resiliently secured in the flow channel.

The turbulating flow channel element optionally includes a plurality of individual thermally conductive turbulator elements secured to one another and nonuniformly distributed generally around a central axis of the flow channel.

The turbulating flow channel element is optionally a flexible screw auger.

At least some of the plurality of catalytic nanoparticles optionally comprise a substantially pure metal or a metal alloy containing at least one metal selected from the group: nickel, platinum, iridium, and palladium.

At least some of the plurality of catalytic nanoparticles optionally comprise a substantially pure metal or metal alloy containing nickel.

At least one outer surface of the turbulating flow channel element optionally includes a porous, chemically inert, and thermally conductive coating.

The optional porous, chemically inert, and thermally conductive coating optionally comprises aluminum oxide ($Al_2O_3$)

The optional porous, chemically inert, and thermally conductive coating optionally comprises polytetrafluoroethylene (PTFE)

A fuel system can optionally comprise an embodiment of the chemical reactor, wherein optionally the source is a fuel tank, the at least one first chemical reactant includes a vehicle fuel existing in a first chemical form, the at least one second reaction product is a vehicle fuel existing in a second chemical form, and the destination is a motive engine configured to derive motive power from the second chemical form of the vehicle fuel.

The first reactant form of the fuel for the fuel system can optionally comprise at least one type of hydrocarbon.

The first reactant form of the fuel for the fuel system can optionally comprise an endothermic fuel suitable for hypersonic or near-earth aerospace vehicles.

In the fuel system, the catalytic reaction is optionally a thermal cracking reaction.

In the fuel system, the first reactant form of the fuel optionally comprises a hydride.

In the fuel system, the hydride optionally comprises ammonia borane ($NH_3BH_3$).

In the fuel system, the hydride optionally comprises alane ($AlH_3$).

In the fuel system, the hydride optionally includes at least one hydrogen-charged carbon boron-nitrogen heterocycle material.

In the fuel system, the second chemical form of the fuel optionally includes hydrogen ($H_2$).

In the fuel system, at least some of the plurality of catalytic nanoparticles optionally comprise a substantially pure metal or a metal alloy containing at least one metal selected from the group: nickel, platinum, iridium, and palladium.

A method of providing vehicle fuel to a motive engine comprises adding a plurality of catalytic nanoparticles to a fuel existing in a first chemical form to form a first fuel nanofluid. The first fuel nanofluid is flowed through a flow channel having a turbulating element secured therein. The flow channel forms at least part of a system providing fluid communication between a fuel tank and a motive engine. The flow channel also houses a first chemical reaction converting the first nanofluid into a second nanofluid facilitated by the plurality of catalytic nanoparticles. The second nanofluid includes at least one reaction product includes a fuel existing in a second chemical form that is suitable for use in a second chemical reaction powering the motive engine.

The method optionally further comprises adding or removing heat from the flow channel for controlling the reaction rate in the flow channel.

The method optionally includes adding heat to the flow channel that is derived from the second chemical reaction in the motive engine.

In the method, the first chemical form of the fuel optionally comprises at least one type of hydrocarbon.

In the method, the first chemical form of the fuel optionally comprises a hydride.

In the method the fuel existing in a second chemical form optionally comprises hydrogen ($H_2$).

When the fuel existing in a second chemical form comprises hydrogen ($H_2$), the method optionally further comprises the step of separating at least a portion of the converted hydrogen ($H_2$) from a remainder of the second nanofluid prior to using the hydrogen in the second chemical reaction.

When the fuel existing in a second chemical form comprises hydrogen ($H_2$), and the method further comprises the step of separating at least a portion of the converted hydrogen ($H_2$) from a remainder of the second nanofluid prior to using the hydrogen in the second chemical reaction, the motive engine is optionally an internal combustion engine.

When the fuel existing in a second chemical form comprises hydrogen ($H_2$), and the method further comprises the step of separating at least a portion of the converted hydrogen ($H_2$) from a remainder of the second nanofluid prior to using the hydrogen in the second chemical reaction, the motive engine is optionally at least one electric motor driven at least in part by electrical power provided via the second chemical reaction of the hydrogen taking place in a hydrogen fuel cell.

DETAILED DESCRIPTION

Figure 1:
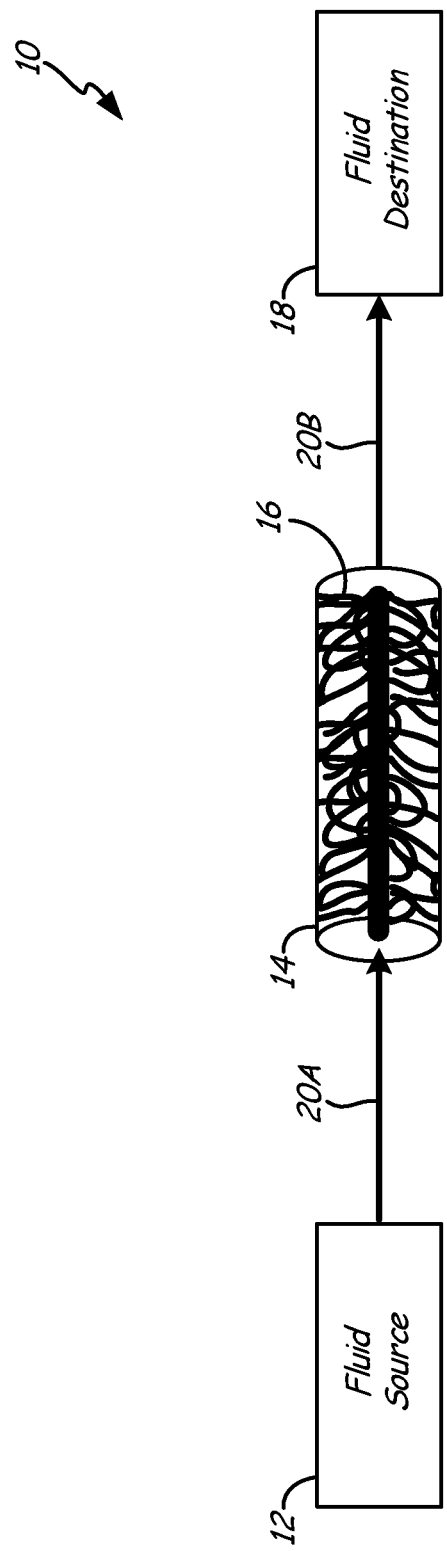
FIG. 1 shows a flow diagram of a chemical reaction.

FIG. 1 includes chemical reactor system 10, first reactant source 12, nanofluid transport channel 14, transport channel element 16, second reaction product destination 18, first inlet nanofluid 20A, and second outlet nanofluid 20B. FIG. 1 is a simplified, generic flow chart of chemical reactor system 10. Transport channel 14 provides fluid communication between first reactant source 12 and second reaction product destination 18. Transport channel element 16 is disposed in transport channel 14.

As will be explained in more detail below, first inlet and second outlet nanofluids 20A, 20B include a plurality of catalytic nanoparticles dispersed in a fluid base. During transport from source 12 to destination 18, one or more reactants (from source 12) contained in nanofluid 20A simultaneously undergo at least one desired chemical reaction to form at least one reaction product forming at least a part of nanofluid 20B. In conjunction with the catalytic nanoparticles (not shown in FIG. 1), transport channel element 16 helps facilitate one or more catalytic reactions of inlet nanofluid 20A into outlet nanofluid 20B. The catalytic reaction(s) can be endothermic or exothermic, and configured to proceed at an easily controllable rate during transport through channel 14. In the event that the catalytic reaction is endothermic or exothermic, temperatures inside channel 14 can be managed by respectively adding or removing thermal energy Q from nanofluid 20. This can be done either by controlling the initial fluid temperature proximate source 12, and/or by thermally conducting thermal energy Q into or out of nanofluids 20A/20B via channel 14 and element 16.

Element 16 evenly disperses and controls the flow and thermal profile of nanofluids 20A/20B across channel 14, including adjacent the channel walls. This arrangement also saves the space and time of having separate reactor vessels and transport channels. Transport channel 14 with element(s) 16 can be adapted to any number of applications. As FIG. 1 shows a very generic representation of channel 14 and reactor 16, source 12 and destination 18 will depend on the particular application of reactor system 10. In certain example embodiments, system 10 is part of a fixed in place plant. In certain of these examples, source 12 can be a feedstock or storage tank, while destination 18 can represent the final plant outlet. It will also be recognized that source 12 and/or destination 18 can alternatively be the respective beginning or end of one or more intermediate plant subsystems. It will also be recognized that certain elements specific to individual systems have been omitted for clarity. Examples of such equipment can include but are not limited to separators, filters, valves, return/recycle lines, etc.

In certain other embodiments, system 10 can be all or part of a fuel system installed onto a motorized vehicle. The stored fuel or feedstock existing in a first chemical form at source 12 can be converted into a usable fuel or fuel precursor having a second chemical form during transport to destination 18. Here, the second chemical form of the fuel is directly usable by a motive engine at destination 18 to produce motive power. An example of this type of embodiment is shown and explained with respect to FIG. 3.

Figure 2A:
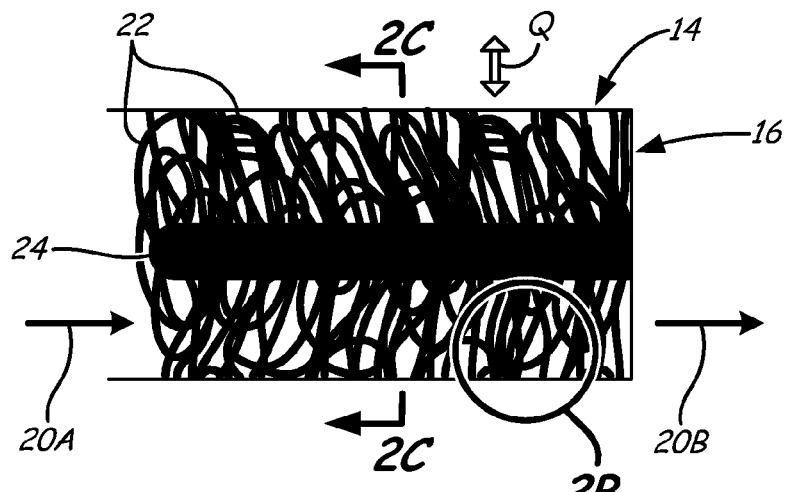
FIG. 2A depicts a fluid, a flow channel, and flow channel element.

FIG. 2A depicts flow channel 14, transport channel element 16, reactant nanofluid 20A, reaction product nanofluid 20B, outer turbulator elements 22, and central wire element 24. Channel 14 can be the interior of any path such as a standalone pipe or tube, including one or more fuel lines. Standalone channel 14 can be disposed through a larger hollow article, such as a strut, casing, frame, or other structure, or alternatively can be bored through a solid component.

As shown in FIG. 1, element 16 is disposed within at least a portion of flow channel 14. Element 16 includes a plurality of outer turbulator elements 22, the combination of which facilitate mixing and heat transfer in channel 14. In certain embodiments, element 16 is compressible and can be retained resiliently to the interior of at least a longitudinal portion of flow channel 14. In this way, resilient compressible element 16 can be radially compressed to facilitate insertion and retention. Resilient element 16 radially expands to contact the walls of channel 14, holding itself in place without the need for separate fastening means. In this example, channel 14 is a cylindrical channel, as is the general shape of element 16. However, it will be appreciated that elements 16 can be adapted to non-cylindrical flow channels. In addition, element 16 can also include a central wire 24 extending longitudinally generally down its axial center to which at least some of outer turbulator elements 22 are secured. This can provide additional axial stability and rigidity to facilitate insertion and removal of element 16.

By providing element 16 to facilitate mixing and heat transfer, it helps maintain a catalytic reaction in channel 14 converting first reactants in nanofluid 20A into second reaction products in nanofluid 20B. In this example element 16 is fabricated from a plurality of individual irregular cylindrical turbulator elements 24 wrapped and/or secured around one another. The plurality of individual turbulator elements can be made flexible and nonuniformly distributed around a central axis forming a compressible structure (element 16) for placement in channel 14. The exact configuration of turbulators 24 can be customized to control the reaction rate (and thus the rate of heat transfer, generation, and/or absorption in nanofluids 20A, 20B) and the temperature window of the catalytic reaction. Example catalytic reactions are described below.

Figure 2B:
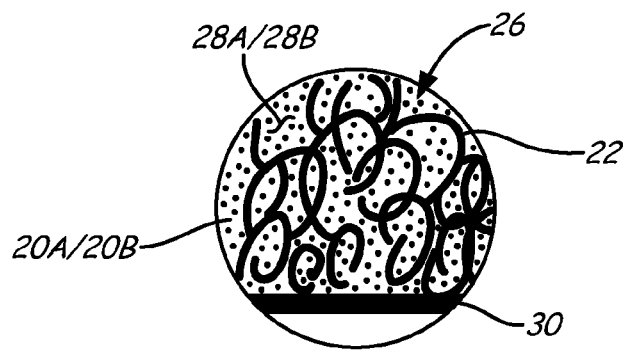
FIG. 2B is a magnified view of a portion of FIG. 2A.
Figure 2C:
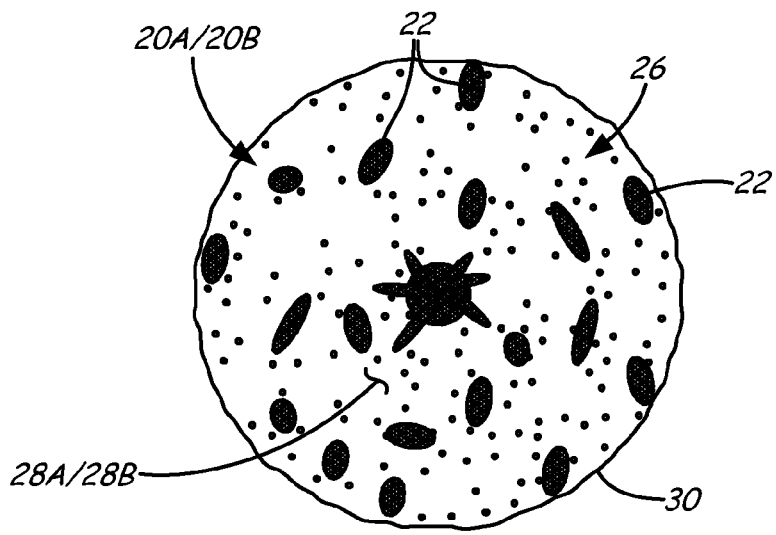
FIG. 2C shows a radial cross-section of the flow channel with the flow channel element and the nanofluid.

FIG. 2B includes flow channel 14, channel element 16, nanofluids 20A, 20B, element outer surfaces 22, turbulator elements 24, catalytic nanoparticles 26, base fluid 28, and flow boundary 30. FIG. 2B is a magnified view of a portion of FIG. 2A. FIG. 2C is a radial cross-section of channel 14 and element 16 with nanofluids 20A, 20B.

Nanofluids 20A, 20B includes a dispersion of nanoparticles 26 in respective base fluids 28A, 28B. Nanoparticles 26 can have a diameter of less than about 100 nm. A nanofluid suspension such as nanofluids 20A, 20B differ from conventional fluid suspensions (such as fluidized beds) as nanoparticles 26 do not accumulate to block flow, or settle under gravity during flow transients. As described in more detail below with respect to specific example embodiments, a plurality of catalytic nanoparticles 26 are selected and configured to facilitate a reaction converting first reactants in base fluid 28A (provided from source 12) into second reaction products in base fluid 28B proximate destination 18. In one example, nanoparticles 26 are configured to catalyze an endothermic reaction. In other examples, nanoparticles 26 are configured to facilitate an exothermic reaction requiring heat removal.

As noted above, element(s) 16 can be customized to be compressible and resiliently securable in conjunction with the cross-section and length of individual flow passage(s) 14. In addition to eliminating the need for fasteners, this also allows optimization of the combination of element 16 relative to passage 14 for improved control of both heat transfer and reaction rate while maintaining the system in a compact package. A suitable structural basis for a static embodiment of element 16 is a heat exchanger thermal transfer element. Examples of such elements are available from Cal Gavin Limited of Alcester, Warwickshire, United Kingdom and sold under the trade designation HITRAN®. Such elements are typically used in heat exchanger tubes to increase their thermal efficiency. Alternatively, element 16 can be rotating element such as a flexible screw auger. The auger and/or the flow channel 14 can include polytetrafluoroethylene (PTFE) either as a coating or as a structural element to facilitate strength and resiliency when element 16 contacts flow boundary 30. A flexible element 16 can help reduce foaming in certain fluid suspensions such as ammonia borane. These and similar arrangements can increase available heat transfer surface area relative to a bare channel 14

In this example, proximate fluid source 12 (shown in FIG. 1) a plurality of catalytic nanoparticles 26 can be added to inlet fluid base 28A to form nanofluid 20A/20B. Nanoparticles 26 can comprise a substantially pure metal or an alloy having one or more transition or noble metals. Examples of these metals include but are not limited to nickel, platinum, iridium, or palladium. Selection and size of nanoparticles 26 depend on optimization of the particular chemical reaction being performed, as well as the thermal requirements to facilitate the catalytic reaction of nanofluid 20A/20B. As described above, nanoparticles 26 remain suspended in fluid base 28A as it is converted catalytically into outlet fluid base 28B during transport toward outlet 18 (shown in FIG. 1). The arrangement of turbulator elements 22 and optional central wire element can help to keep nanoparticles 26 well mixed in the base fluid as it is converted from reactants 28A to reaction products 28B. The motion and suspension of nanoparticles 26 in base fluid 28A/28B in combination with element 16 also contributes favorably to improve overall thermal conductivity of nanofluid 20A/20B, further enhancing heat transfer and reaction control.

Because flow channel element 16 extends out to and contacts the edges of flow channel 14, nanofluid 20A/20B is continuously mixed as it flows around the various outer turbulator elements 22 and optional central wire 24 (shown in FIG. 2A). Thus laminar flow is substantially reduced or eliminated at and around flow boundary 30, preventing uneven accumulation of base fluid 28A proximate destination 18 caused by a lack of catalytic contact. Nanofluids also can be modeled as single-phase fluids, while traditional fluid suspensions have more complex dynamics and less predictable multi-phase models. This and similar arrangements also minimize cross-sectional temperature gradients consistent with laminar flow at boundary 30. This not only improves uniform fluid heat transfer, but also allows steady and predictable reaction rate through flow channel 14 by allowing for more precise temperature control.

In an ordinary flow channel, the fluid cannot uniformly react due to boundary effects. Any reactants contained adjacent the flow boundary would be less likely to have the reaction induced because it would be difficult to achieve the proper balance of reactant, catalyst surface area, and temperature. To complete the reaction, reactive and heat transfer surface areas would have to be added to the flow transport channel in other ways. Surface area can be increased by enlarging the inner diameter of the fluid channel, however this exponentially increases the pressure drop through the channel and would require a corresponding exponential increase in mechanical energy to push the fluid through. A separate reactor for the chemical reaction could be provided but would increase complexity, add weight and reduce available space for other uses. This could be problematic in transportation applications, such as automotive and aerospace vehicles requiring chemical reaction or reformation of fuel prior to being converted to mechanical energy.

In some embodiments, outer surfaces of turbulators 22 will also have a thermally conductive coating so as to minimize thermal resistance. This can further facilitate heat transfer Q into or out of channel 14 by providing direct thermal conductivity between the walls of channel 14, channel element 16, and nanofluids 20A, 20B. In certain embodiments, coating 26 can be a thermally conductive, minimally reactive substance such as a metal oxide, so as to provide adequate thermally conductive surface area to maintain the heat transfer coefficient. Here, coating 26 is applied using a wash coat comprising a liquid suspension of the coating, such as aluminum oxide ($Al_2O_3$).

Figure 3:
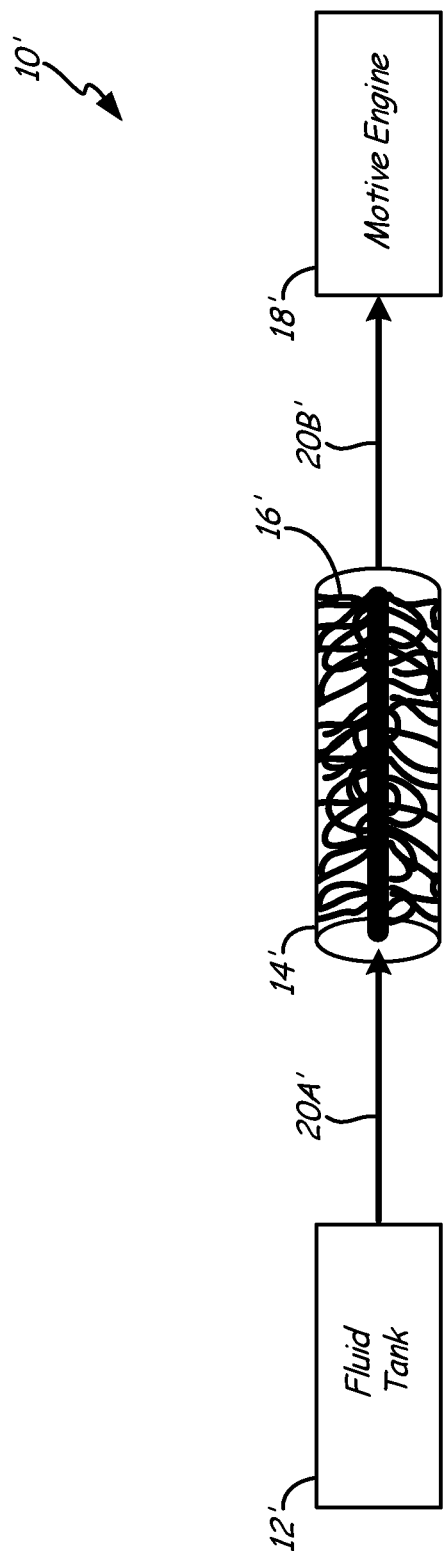
FIG. 3 shows a reaction flow diagram for a fuel system.

FIG. 3 includes fuel system 10', first fuel source 12', fuel transport channel 14', transport channel element 16', second fuel destination 18', first fuel nanofluid 20A', and second fuel nanofluid 20B'. FIG. 3 is a more specific example of system 10 more directly applicable to a fuel system for a motor vehicle. In the example of FIG. 3, first fuel nanofluid 20A' includes a transportation fuel existing in a first chemical form serving as the base fluid for a dispersion of catalytic nanoparticles. The first chemical form of the fuel is stored in tank 12' and nanoparticles (e.g. nanoparticles 26 described above) are added to the base fluid proximate the exit of tank 12' and/or the entrance to channel 14'. Catalytic nanoparticles facilitate chemical reaction of the base fluid from tank 12' into a transportation fuel having a second chemical form during transport through channel 14' to the motive engine 18'. Element 16' provides continuous mixing and heat transfer throughout channel 14'. Nanoparticles remain in second nanofluid 20B' which now includes fuel existing in the second chemical form. This second fuel form serves as base fluid for nanofluid 20B'. In the motive engine 18', at least one of the reaction products in the second form of the fuel undergoes a subsequent reaction or other processing in order to convert the reaction products into motive power for a vehicle as explained below.

It will be of course recognized that other elements typically disposed in a fuel system (e.g., separators, filters, sensors, etc.) can be included in system 10' but are omitted from FIG. 3 for clarity. For example, in embodiments relating to conversion of hydrocarbon based fuels it will be recognized that the first chemical forms of the fuel are typically processed or scrubbed of catalyst fouling constituents such as sulfur and lead before nanoparticles are added to form first fuel nanofluid 20A'.

System 10' can be all or part of a small mobile scale fuel system such as in a motorized land, sea, or aerial traveling vehicle. For example, system 10' can be installed on a vehicle powered by hydrogen fuel cells using a concept generally known as hydrogen storage. Here, fuel 20A' is stored in a first stable and compact hydrogen dense form. Examples include hydrides such as ammonia borane ($NH_3BH_3$), which can be catalytically thermolysed in an exothermic reaction. Ammonia borane itself exists in a solid form but can be dissolved or suspended in an appropriate fluid. For example, ammonia borane can be dissolved in certain ionic liquid solvents. It can also be suspended in temperature stable oil-based liquids like silicone oils. Alternatively, alane ($AlH_3$) can be used as a hydride, which undergoes an endothermic reaction to release hydrogen for a fuel cell. Other classes of hydrogen storage fuels can include carbon-boron-nitrogen heterocycle materials that are currently under development. Used materials can be captured from the stream, recycled and regenerated for repeated use as hydrogen storage fuels.

Nickel or other suitable catalytic nanoparticles are added to the first base fluid fuel from tank 12' with both being flowed through channel 14'. Fuel in first nanofluid 20A' undergoes a reaction from its first chemical form to release hydrogen ($H_2$) as fuel in a second chemical form suitable providing power to motive engine 18'. Hydrogen as the second fuel form, other reaction byproducts, and unreacted quantities of the first chemical form of the fuel can form part of second nanofluid 20B'. The $H_2$ can be isolated from one or more other components of nanofluid 20B using equipment appropriate for the particular reaction, then subsequently combined with atmospheric or other available oxygen in a hydrogen fuel cell to generate electric power for driving one or more electric motors (engine 18'). Details on fuel cells are relatively well known and will not be repeated here. Catalyst and/or other reaction byproducts such as the can be captured from the stream of fuel 20B, stored, and regenerated at a later time into their first hydride or other hydrogen storage form.

In another example, fuel from tank 12' may be a more complex "endothermic" fuel for hypersonic turbine or ramjet engines. Endothermic fuels can provide a heat sink function due to immense cooling demands of hypersonic aircraft. In one example, the first or second chemical form of the fuel can be used as a heat sink for temperature management purposes (e.g. lubricant oil cooling) prior to being harnessed for motive power. Thus a portion of the waste energy from the second reaction can be captured and utilized to maintain the first reaction, providing heat Q to maintain channel 14' at a suitable temperature to facilitate the catalytic reaction. Conversion of the first chemical form of the fuel in to the second form may include a form of "fuel cracking". As one specific example of this approach, the fuel is a liquid hydrocarbon specially designed for use in hypersonic or near-earth aerospace applications.

Since nanoparticles 26' are dispersed in nanofluids 20A'/20B', filtering and/or separating means as described above (not shown) can optionally be provided to remove the particles from the stream and return them back to the beginning of flow channel 14' proximate first tank 12'. The nanoparticles can alternatively be consumed during the use of the fuel in its converted second chemical form if the fuel is to be combusted with air.

In addition to on-vehicle uses, system 10' can be part of land or sea based fueling infrastructure for powering fuel cell vehicles. In certain embodiments of this alternative example, system 10' can be installed at a terminus or lateral extension of a hydrocarbon transport pipeline (substituted for fuel tank 12'). System 10' could then include additional piping 14' containing flow channel element 16'. Nanoparticles 30 (shown in FIGS. 2A-2C and FIG. 4) can catalyze the appropriate reaction to convert the arriving or locally stored first fuel 20A' into second form 20B' (hydrogen) prior to being provided to one or more motorized vehicles (substituted for motive engine 18'). By way of example, system 10' can be used to provide converted hydrogen fuel to motorized vehicles directly at a fueling station connected to the pipeline, or indirectly via tankers or other transport means at a terminal whereby the reaction product(s) are sent to one or more remote fueling stations.

In this example, first fuel 20A' may be a specialized or a commercially produced hydrocarbon mixture, such as compressed natural gas (CNG), liquefied petroleum gas (LPG), gasoline, diesel fuel, or the like. Steam may be added to fuel 20A' causing it to undergo an endothermic reforming reaction catalyzed by catalytic nanoparticles in channel 14. In such a reaction, primarily $H_2$ and $CO_2$ gases are produced. The $CO_2$ and other byproducts and contaminants are substantially removed prior to fueling and/or operating the vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A chemical reactor comprising:
   a flow channel configured to house at least one catalytic reaction converting at least a portion of a first nanofluid entering the channel into a second nanofluid exiting the channel, the flow channel including at least one turbulating flow channel element disposed axially along at least a portion of the flow channel;
   a source in fluid communication with an entrance of the flow channel and configured to contain at least one first chemical reactant serving as a first base fluid for the first nanofluid;
   a destination in fluid communication with an exit of the flow channel receiving at least one second chemical reaction product serving as a base fluid for the second nanofluid;
   wherein a plurality of catalytic nanoparticles dispersed in the first nanofluid are configured to catalytically react the at least one first chemical reactant into the at least one second chemical reaction product in the flow channe;
   wherein at least one outer surface of the turbulating element includes a porous, chemically inert, and thermally conductive coating;
   wherein the coating comprises aluminum oxide ($Al_2O_3$); and
   wherein the coating comprises polytetrafluoroethylene (PTFE).

2. The reactor of claim 1, wherein the turbulating flow channel element is compressible and is resiliently secured in the flow channel.

3. The reactor of claim 1, wherein the turbulating flow channel element includes a plurality of individual thermally conductive turbulator elements secured to one another and nonuniformly distributed generally around a central axis of the flow channel.

4. The reactor of claim 1, wherein the turbulating flow channel element is a flexible screw auger.

5. The reactor of claim 1, wherein at least some of the plurality of catalytic nanoparticles comprise a substantially pure metal or a metal alloy containing at least one metal selected from the group: nickel, platinum, iridium, and palladium.

6. The reactor of claim 5, wherein the selected metal is nickel.

7. A fuel system comprising:
a chemical reactor as recited in claim 1;
wherein the source is a fuel tank, the at least one first chemical reactant includes a vehicle fuel existing in a first chemical form, the at least one second reaction product is a vehicle fuel existing in a second chemical form, and the destination is a motive engine configured to derive motive power from the second chemical form of the vehicle fuel.

8. The fuel system of claim 7, wherein the first reactant form of the fuel comprises at least one type of hydrocarbon.

9. The fuel system of claim 8, wherein the first reactant form of the fuel comprises an endothermic fuel suitable for hypersonic or near-earth aerospace vehicles.

10. The fuel system of claim 8, wherein the catalytic reaction is a thermal cracking reaction.

11. The fuel system of claim 7, wherein the first reactant form of the fuel comprises a hydride.

12. The fuel system of claim 11, wherein the hydride comprises ammonia borane ($NH_3BH_3$).

13. The fuel system of claim 11, wherein the hydride comprises alane ($AlH_3$).

14. The fuel system of claim 7, wherein the second chemical form of the fuel includes hydrogen ($H_2$).

15. The fuel system of claim 7, wherein at least some of the plurality of catalytic nanoparticles comprise a substantially pure metal or a metal alloy containing at least one metal selected from the group: nickel, platinum, iridium, and palladium.

16. A method of providing vehicle fuel to a motive engine, the method comprising:
adding a plurality of catalytic nanoparticles to a fuel existing in a first chemical form to form a first fuel nanofluid; and
flowing the first fuel nanofluid through a flow channel having a turbulating element secured therein, the flow channel forming at least part of a system providing fluid communication between a fuel tank and a motive engine, the flow channel also housing a first chemical reaction converting the first nanofluid into a second nanofluid facilitated by the plurality of catalytic nanoparticles;
wherein the second nanofluid includes at least one reaction product being a fuel existing in a second chemical form that is suitable for use in a second chemical reaction to provide power for the motive engine;
wherein at least one outer surface of the turbulating element includes a porous, chemically inert, and thermally conductive coating;
wherein the coating comprises aluminum oxide ($Al_2O_3$); and
wherein the coating comprises polytetrafluoroethylene (PTFE).

17. The method of claim 16, further comprising:
adding or removing heat from the flow channel for controlling the reaction rate in the flow channel.

18. The method of claim 17, wherein heat is added to the flow channel that is derived from the second chemical reaction in the motive engine.

19. The method of claim 16, wherein the first chemical form of the fuel comprises at least one type of hydrocarbon.

20. The method of claim 16, wherein the first chemical form of the fuel comprises a hydride.

21. The method of claim 16, wherein the fuel existing in a second chemical form comprises hydrogen ($H_2$).

22. The method of claim 21, further comprising the step of separating at least a portion of the converted hydrogen ($H_2$) from a remainder of the second nanofluid prior to using the hydrogen in the second chemical reaction.

23. The method of claim 21, wherein the motive engine is an internal combustion engine.

24. The method of claim 21, wherein the motive engine is at least one electric motor driven at least in part by electrical power provided via the second chemical reaction of the hydrogen taking place in a hydrogen fuel cell.

* * * * *